United States Patent
Diemer et al.

(10) Patent No.: US 8,636,125 B2
(45) Date of Patent: *Jan. 28, 2014

(54) ACTUATION DEVICE HAVING WIPER SEALS FOR A DUAL CLUTCH TRANSMISSION

(75) Inventors: John A. Diemer, Farmington Hills, MI (US); Edward J. Billings, Ann Arbor, MI (US); Joakim Hogberg, Vanersborg (SE); James M. Partyka, Clarkston, MI (US); Robert Neil Paciotti, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 208 days.

This patent is subject to a terminal disclaimer.

(21) Appl. No.: 12/855,820

(22) Filed: Aug. 13, 2010

(65) Prior Publication Data

US 2011/0048887 A1 Mar. 3, 2011

Related U.S. Application Data

(60) Provisional application No. 61/237,096, filed on Aug. 26, 2009.

(51) Int. Cl.
*F16D 25/08* (2006.01)
*F16D 21/00* (2006.01)
*F16D 25/10* (2006.01)

(52) U.S. Cl.
USPC ............... 192/48.607; 192/85.54; 192/30 W

(58) Field of Classification Search
USPC ...................................... 192/48.607, 30 W
See application file for complete search history.

(56) References Cited

U.S. PATENT DOCUMENTS

| | | | |
|---|---|---|---|
| 4,705,151 A * | 11/1987 | Leigh-Monstevens et al. | 192/111.12 |
| 4,723,643 A * | 2/1988 | Numazawa et al. | 477/78 |
| 5,287,951 A * | 2/1994 | Voit et al. | 192/85.54 |
| 6,328,148 B2 * | 12/2001 | Winkelmann et al. | 192/85.51 |
| 6,502,682 B2 * | 1/2003 | Koschmieder et al. | 192/85.54 |
| 6,659,252 B2 * | 12/2003 | Heller | 192/85.51 |
| 6,857,513 B2 * | 2/2005 | Tornatore et al. | 192/48.91 |
| 7,246,692 B2 * | 7/2007 | Braford | 192/48.611 |

(Continued)

FOREIGN PATENT DOCUMENTS

| | | |
|---|---|---|
| DE | 602004001215 T2 | 3/2007 |
| DE | 602004009042 T2 | 6/2008 |
| EP | 0185176 * | 6/1986 |
| EP | 0185176 A1 | 8/1986 |

OTHER PUBLICATIONS

Machine Translation of EP0185176.*

*Primary Examiner* — David D Le
*Assistant Examiner* — Colby M Hansen

(57) ABSTRACT

A dual clutch actuation device generates the axial compression force required to compress a first and second set of frictional elements of a dual clutch module. Dual clutch actuation device includes a first and second annular piston. The annular pistons are arranged in concentric annular piston slots. Together the piston and annular slots form annular piston chambers. The actuation device further includes a first set of wiper seals and a second set of wiper seals disposed in a first and a second annular channel in each of the annular pistons. Advantageously, contamination of the piston chambers is reduced or eliminated through the wiping or cleansing action of the first and second set of wiper seals against walls of the annular slots formed in the housing of the actuation device.

15 Claims, 5 Drawing Sheets

(56) References Cited

U.S. PATENT DOCUMENTS

| | | | |
|---|---|---|---|
| 7,267,215 B2 | 9/2007 | Hans | |
| 7,287,634 B2 * | 10/2007 | Agner et al. | 192/48.603 |
| 7,322,455 B2 * | 1/2008 | Vetter et al. | 192/48.9 |
| 7,392,890 B2 * | 7/2008 | Agner | 192/48.8 |
| 2011/0079481 A1 * | 4/2011 | Carey et al. | 192/48.611 |
| 2011/0094845 A1 * | 4/2011 | Hogberg et al. | 192/48.61 |

* cited by examiner

ACTUATION DEVICE HAVING WIPER SEALS FOR A DUAL CLUTCH TRANSMISSION

CROSS-REFERENCE TO RELATED APPLICATIONS

This application claims the benefit of U.S. Provisional Application No. 61/237,096, filed on Aug. 26, 2009, which is hereby incorporated in its entirety herein by reference.

TECHNICAL FIELD

The present disclosure relates to transmissions and more particularly to a dual clutch actuation device for a compact, dual clutch multiple speed transmission.

BACKGROUND

The statements in this section merely provide background information related to the present disclosure and may or may not constitute prior art.

A typical dual input multiple speed transmission has a first input shaft and a second input shaft that is a hollow sleeve shaft that is concentric with the first input shaft. The first and second input shafts are selectively coupled to the engine crankshaft through a dual clutch. The dual or twin clutch has two independent clutch units that are each separately rotationally fixed to one of the input shafts. The clutch units include friction elements that are axially compressed against friction elements that are ultimately rotationally fixed to the crankshaft. A dual clutch actuation device generates the apply force necessary to axially compress the friction elements and rotationally couple the input shafts with the crankshaft.

While current dual clutch actuation devices achieve their intended purpose, the need for new and improved configurations which exhibit improved performance, is essentially constant. For example, one problem not addressed by the prior art is the contamination of the actuation device by particles generated by the wearing of the friction elements of the dual clutch. Accordingly, there is a need in the art for a dual clutch actuation device having improved packaging while providing a mechanism to reduce or eliminate contamination of the actuation device.

SUMMARY

The present invention provides a dual clutch actuation device for a dual clutch transmission. The transmission has two input shafts a first shaft and a second shaft that is a hollow sleeve shaft. The second shaft is concentric with the first shaft. A dual clutch having two clutch units selectively couples a crankshaft of an engine to one of the two input shafts. More specifically, the dual clutch includes members such as a clutch housing having a first set of frictional elements that are rotationally fixed to the crankshaft through a flywheel and other members such hubs having a second set of frictional elements that are rotationally fixed to the input shafts. The first and second frictional elements are axially compressed against each other to couple one of the hubs to the dual clutch housing, thereby transmitting torque from the crankshaft to one of the input shafts. A dual clutch actuation device is provided to generate the axial compression force required to compress the first and second set of frictional elements. Dual clutch actuation device includes a first and second annular piston. The annular pistons include a first end that is in contact with annular bearing assemblies. The annular bearing assemblies are in contact with actuation levers that are in contact with the first set of frictional elements. The annular pistons are arranged in concentric annular piston slots. Together the piston and annular slots form annular piston chambers. The piston chambers are filled with hydraulic fluid. When the hydraulic fluid is pressurized the pistons slide out of the annular slots and apply a force on the actuation levers which in turn apply an axial compression force on the frictional elements.

In one aspect of the present invention, the dual clutch actuation device includes a first and second annular channel in each of the annular pistons.

In another aspect of the present invention, the dual clutch actuation device includes a first set of wiper seals and a second set of wiper seals disposed in the first and second annular channels in each of the annular pistons.

In another aspect of the present invention, the dual clutch actuation device includes a housing having a first annular slot that is radially inward of a second annular slot.

In yet another aspect of the present invention, the dual clutch actuation device includes a housing having a central bore concentric with the annular slots and inward of the first annular slot.

In yet another aspect of the present invention, the dual clutch actuation device includes a position sensor attached to the housing of the actuation device.

In yet another aspect of the present invention, a position sensor includes two sensing elements, one for sensing the position of the first annular piston and the other for sensing the position of the second annular piston.

The above features and advantages and other features and advantages of the present invention are readily apparent from the following detailed description of the best modes for carrying out the invention when taken in connection with the accompanying drawings.

DESCRIPTION

Figure 1:
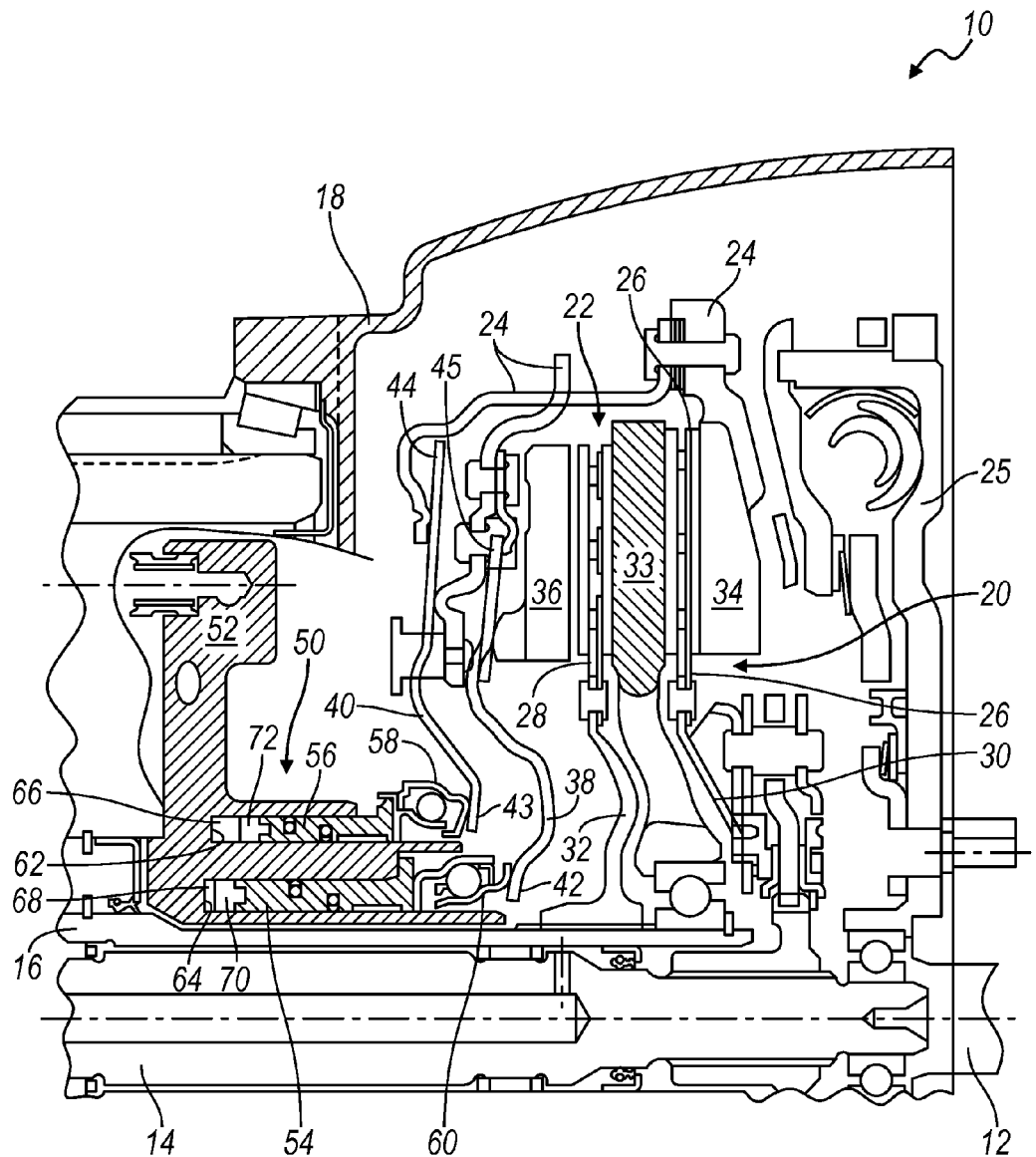
FIG. 1 is a partial cross-sectional view of a torque transmitting device for a dual input transmission, in accordance with an embodiment of the present invention.

Referring to FIG. 1, a partial cross-sectional view of a torque transmitting device for a dual input transmission (not shown) is generally indicated by reference number 10. The torque transmitting device 10 is for example a dual clutch disposed in a vehicle powertrain. Typically the vehicle powertrain includes an engine and a transmission. In the instant embodiment the transmission includes is a dual input transmission where torque is transferred from the engine via a crankshaft 12 to two input shafts in the transmission: a first input shaft 14 and a second input shaft 16 through selective operation of torque transmitting device 10. The second input shaft 16 is a sleeve (or hollow) shaft that is concentric with and overlies the first input shaft 14. Torque transmitting device 10 is disposed in a transmission housing or bell housing 18

Torque transmitting device 10 has two separate and independent friction clutches 20 and 22 disposed in a clutch housing 24. Clutch housing 24 is rotationally fixed to a flywheel 25. Flywheel 25 is connected to crankshaft 12 and is preferably a dual mass flywheel that is configured to dampen and reduce vibration in the crankshaft 12. Friction clutches 20 and 22 each include friction members 26 and 28. Friction members 26 and 28 are fixed to hub members 30 and 32, respectively. Hub members 30 and 32 are each rotationally fixed to first and second input shafts 14 and 16, respectively. Clutch housing 24 also includes a center plate 33 supported by a bearing and friction elements 34 and 36 that are attached and rotationally fixed to housing 24. Friction members 26 and 28 and friction elements 34 and 36 are configured to form a friction clutch, as is known in the art as a dual clutch. Thus, selective engagement through axial compression of friction member 26 with friction element 34 connects the crankshaft 12 for common rotation with the first input shaft 14. Selective engagement of friction member 28 with friction element 36 connects the crankshaft 12 for common rotation with the second input shaft 16. Friction clutches 20 and 22 may include multiple friction members 26 and 28 that interact with a respective multiple of friction elements 34 and 36 connected to housing 24. The number and size of the friction members will vary based on appropriate torque transmission requirements. Of course, the torque transmission capability of device 10 may be varied by varying the number of friction elements and amount of surface area of each friction element.

The coupling of the crankshaft 12 to the input shafts 14 and 16 is achieved through axial compression of the friction elements by actuation levers 38 and 40. Actuation levers 38, 40 have first end 42, 43 that is in contact with and configured to pivot on housing 24. The second ends 44, 45 are in contact with and configured to receive an apply force generated by an actuation device 50.

Referring now to FIGS. 1 through 4, actuation device 50 includes an annular housing 52, a pair of annular pistons 54 and 56 and a pair of bearing assemblies 58 and 60. Housing 52 is mounted and thus rotationally fixed to bell housing 18 and defines a central bore 61, a pair of annular slots 62 and 64. The central bore 61 is sized to allow the first input shaft 14 and the second input shaft 16 to pass there through. Annular slot 62 is concentric with and disposed radially inward of annular slot 64. The annular pistons 54 and 56 are configured to slide axially within the slots and form piston chambers 66 and 68 therewith. Annular pistons 54 and 56 further include seals 70 and 72, respectively, fixed to an end of pistons 54 and 56. Seals 70 and 72 are configured to prevent excessive leakage of hydraulic fluid between a wall of the piston chambers 66 and 68 and the ends of the pistons. Piston chambers 66 and 68 are filled with hydraulic fluid through clutch feed bores 74 and 76. Bearing assemblies 58 and 60 are actuation bearings that torsionally decouple the rotating elements of clutch 10 (i.e. housing 24 and actuation levers 38 and 40) from the nonrotating members of the actuation device 50 (i.e. pistons 54 and 56).

Figure 3A:
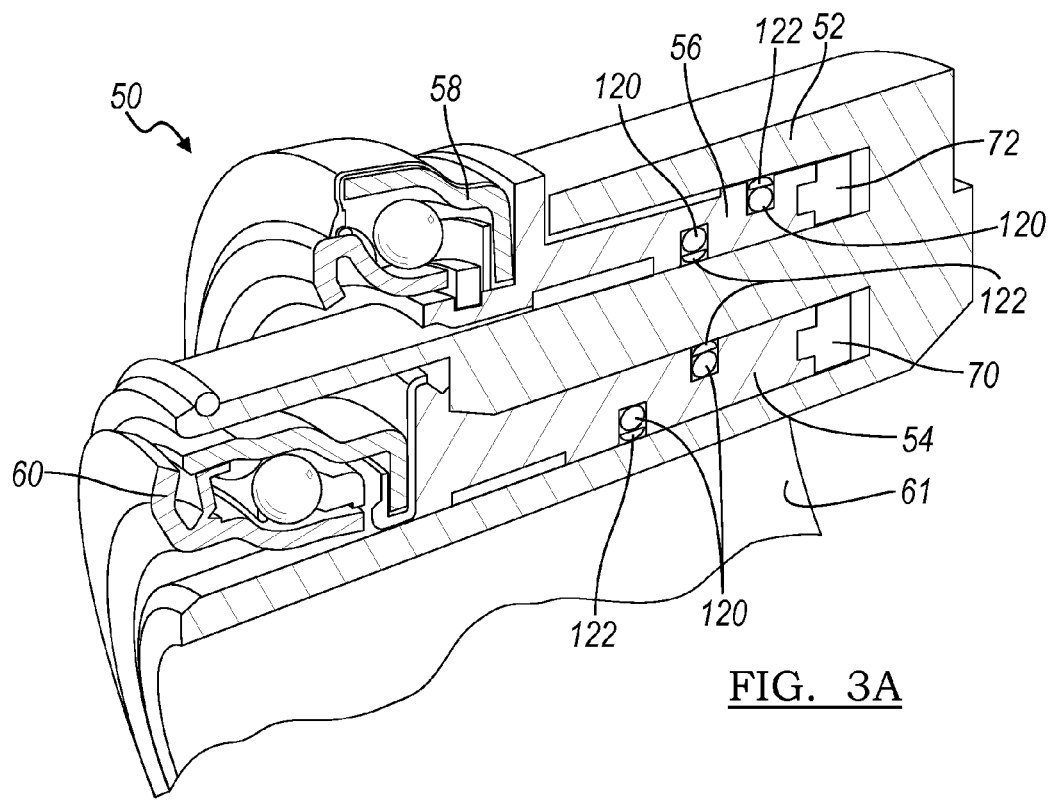
FIGS. 3A and 3B are partial cross-sectional views of the actuation device of FIGS. 2A. and 2B. illustrating the position of seals on the annular pistons, in accordance with an embodiment of the present invention.
Figure 3B:
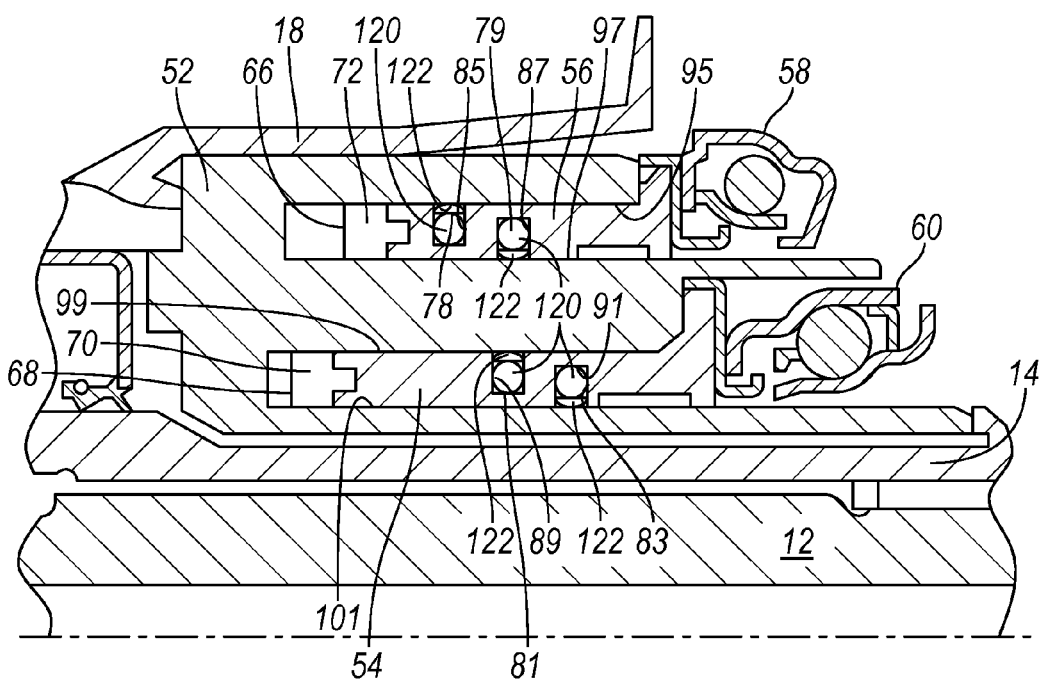
Figure 4:
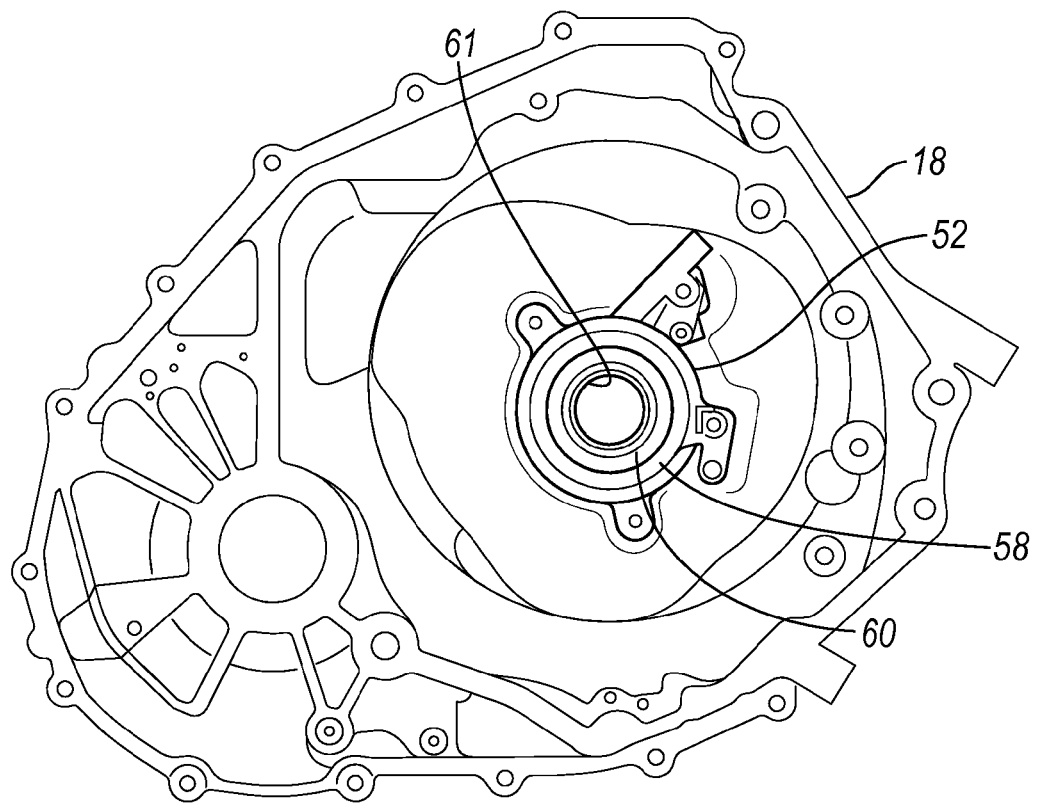
FIG. 4 is a front view of the actuation device of FIGS. 2A. and 2B. attached to a wall of the housing of a transmission, in accordance with an embodiment of the present invention.

With specific reference now to FIGS. 3A and 3B, the actuation device 50 includes additional seals herein referred to as a first set of wiper seals 78 and 79 and a second set of wiper seals 81 and 83. First set of wiper seals 78 and 79 are disposed in annular channels 85 and 87, respectively. Second set of wiper seals 81 and 83 are disposed in annular channels 89 and 91, respectively. Annular channels 85 and 87 are formed in annular piston 54 and annular channels 89 and 91 are formed in annular piston 54. Annular channel 85 has an open end that opposes a wall 95 of slot 62 of housing 52. Annular channel 87 has an open end that opposes a wall 97 of slot 62 of housing 52. Similarly, annular channel 89 has an open end that opposes a wall 99 of slot 64 of housing 52 and annular channel 91 has an open end that opposes a wall 101 of slot 64 of housing 52.

First set of wiper seals 78 and 79 and second set of wiper seals 81 and 83 are configured to protrude from the respective annular channels 85, 87, 89 and 91 to insure a constant seal with the walls 95, 97, 99 and 101. More specifically, each of the wiper seals 78, 78, 81 and 83 include a body portion 120 and a wiper portion 122. The body portion 120 of wiper seal 78 is positioned substantially within the annular channel 85 while the wiper portion 122 protrudes from the channel 85 as required to contact and seal against wall 95. The body portion 120 of wiper seal 79 is positioned substantially within the annular channel 87 while the wiper portion 122 protrudes from the channel 87 as required to contact and seal against wall 97. The body portion 120 of wiper seal 81 is positioned substantially within the annular channel 89 while the wiper portion 122 protrudes from the channel 89 as required to contact and seal against wall 99. The body portion 120 of wiper seal 83 is positioned substantially within the annular channel 91 while the wiper portion 122 protrudes from the channel 91 as required to contact and seal against wall 101.

In operation, first set of wiper seals 78 and 79 function to seal and prevent the flow of hydraulic fluid and/or debris from entering piston chamber 66. Accordingly, second set of wiper seals 81 and 83 function to seal and prevent the flow of hydraulic fluid and/or debris from entering piston chamber 68. Typically, the friction materials in the clutch 10 will break down over time and produce free floating particles throughout the bell housing 18. The present invention, advantageously, substantially eliminates the contamination, caused by free floating particles in the bell housing 18, of piston chambers 66 and 68 of actuation device 10. The contamination is reduced or eliminated through the wiping or cleansing action of the first set of wiper seals 78 and 79 against walls 95 and 97 and the second set of wiper seals 81 and 83 against walls 99 and 101.

Figure 2A:
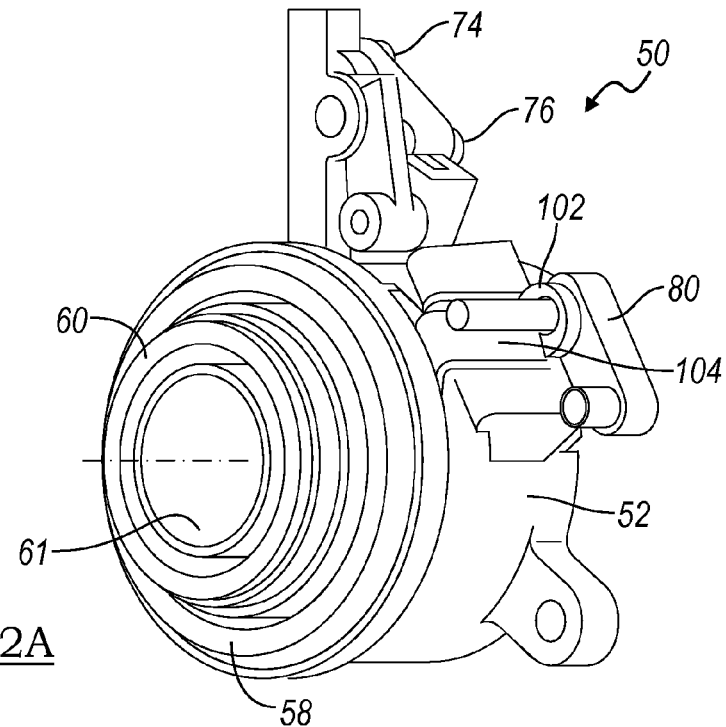
FIG. 2A is a perspective view of front side of an actuation device for activating the torque transmitting device of FIG. 1., in accordance with an embodiment of the present invention.
Figure 2B:
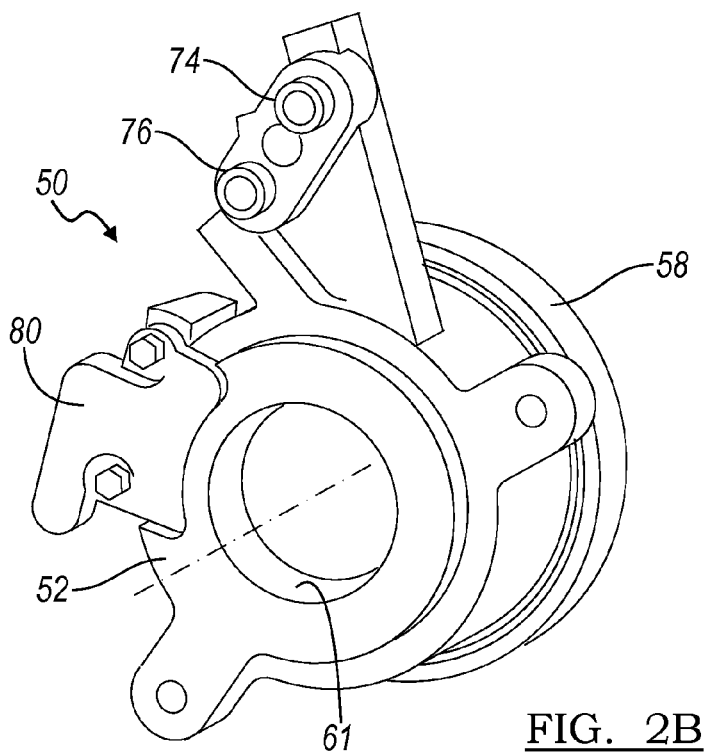
FIG. 2B is a perspective view of back side an actuation device for activating the torque transmitting device of FIG. 1., in accordance with an embodiment of the present invention.
Figure 5:
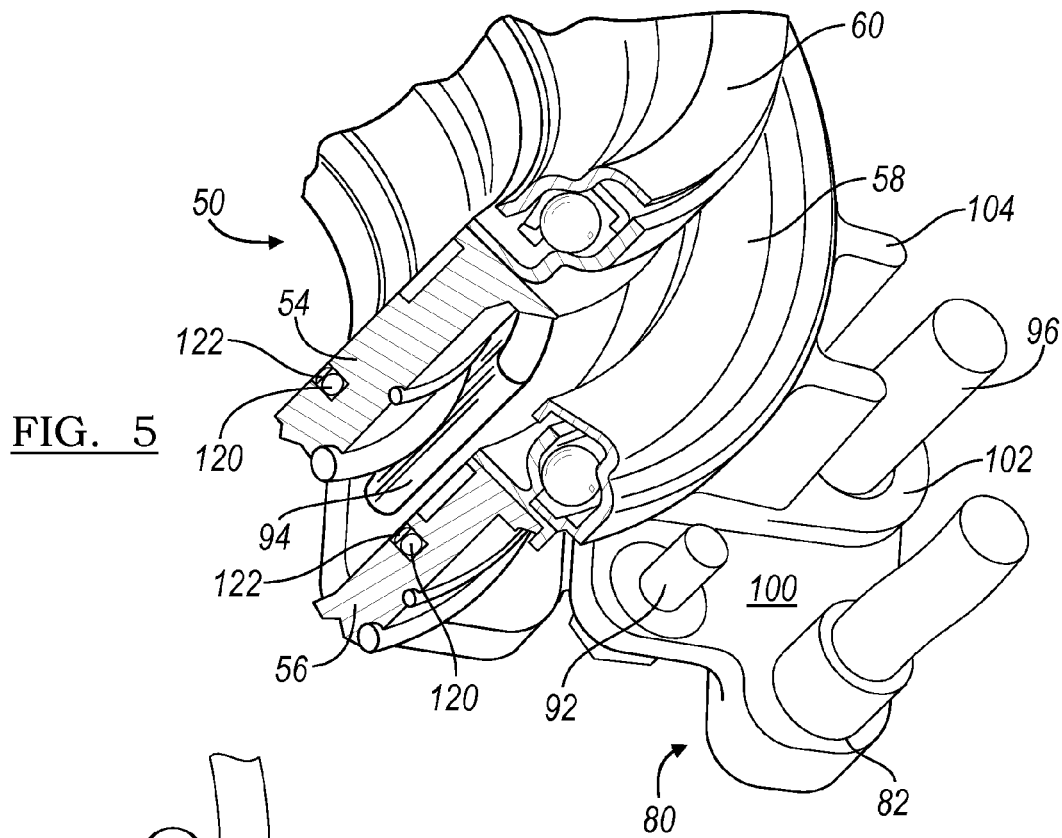
FIGS. 5 and 6 are perspective views of a sensor for sensing the position of the actuation device shown in FIGS. 2A. and 2B., in accordance with an embodiment of the present invention.
Figure 6:
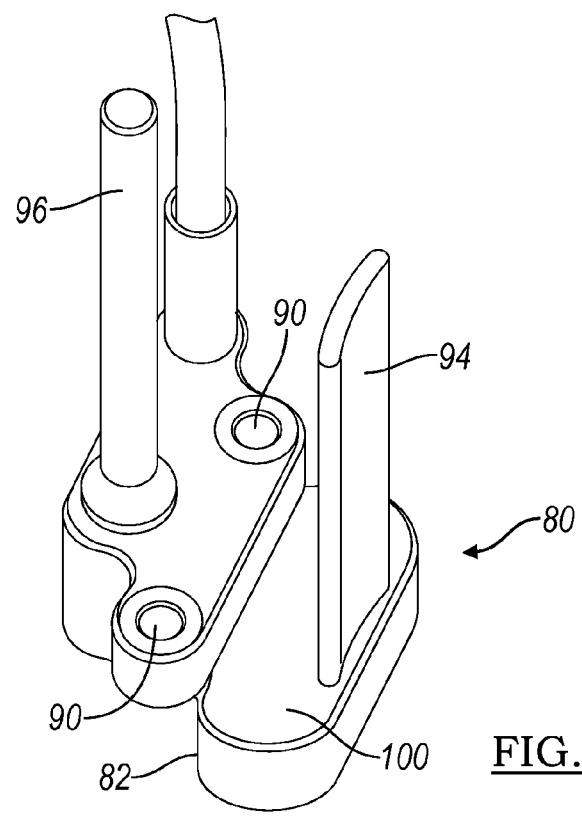

With continuing reference to FIGS. 2A, 2B and now referring to FIGS. 5 and 6, position sensor 80 is fixed to housing 52 for sensing the movement and location of annular pistons 54 and 56. Position sensor 80 includes a sensor housing 82 having a pair of apertures 90 formed therein. Housing 52 includes mounting pins 92 attached to a side of housing 52 that cooperate with apertures 90 formed in sensor 80. The engagement of pins 92 with apertures 90 insures the required orientation and location of sensor 80 relative to annular pistons 54 and 56. More specifically, position sensor 80 includes first and second sensing elements 94 and 96. First and second sensing elements 94 and 96 extend perpendicular to a base 100 of sensor housing 82. First sensing element 94 is disposed between annular pistons 54 and 56 and is configured to sense the movement and position of piston 54. Second sensing element 96 is disposed radially outside of annular pistons 54 and 56 and is configured to sense the movement and position of piston 56. Second sensing element 96 is threaded through an annular ring 102 in a bracket 104 that is fixed to piston 56. The axial movement of ring 102 along sensing element 96 alters the electrical properties of sensor element 96 and generates signal in sensor 80 indicative of a position of piston 58. Sensor 80 is any suitable sensor including Hall Effect sensors, variable reluctance sensors and the like.

In operation hydraulic fluid is pressured and forced through clutch feed bores 74 and 76 to push pistons 54 and 56 out of their respective piston chambers 66 and 68 towards clutch 10. More specifically, pressurized hydraulic fluid is pushed through clutch feed bore 74 into piston chamber 66 forcing annular piston 56 to slide out of the chamber towards clutch 10. As annular piston 56 moves out of the chamber bearing assembly 58 which is in contact with annular piston 56 applies a force to one end of the actuation lever 40. Actuation lever 40 in turn compresses friction element 34 axially against friction member 26 causing friction member 26 to rotate at substantially the same speed as friction element 34. Thus, selectively rotationally coupling crankshaft 12 with first input shaft 14. Similarly, pressurized hydraulic fluid is pushed through clutch feed bores 76 into chamber 68 forcing annular piston 54 to slide out of the chamber towards clutch 10. As annular piston 54 moves out of the chamber bearing assembly 60 which is in contact with annular piston 54 applies a force to one end of the actuation lever 38. Actuation lever 38 in turn compresses friction element 36 axially against friction member 28 causing friction member 28 to rotate at substantially the same speed as friction element 36. Thus, selectively rotationally coupling crankshaft 12 with second input shaft 16.

While the best modes for carrying out the invention have been described in detail, those familiar with the art to which this invention relates will recognize various alternative designs and embodiments for practicing the invention within the scope of the appended claims.

The invention claimed is:

1. A dual clutch actuation device for actuating a dual clutch in a dual clutch transmission, the dual clutch actuation device comprising:
    a housing fixedly secured to the dual clutch transmission and defining first and second annular slots;
    a first annular piston at least partially slidably disposed in the first annular slot, the first annular piston including an axially facing first end, a second end opposite the first end, an outer surface having a first channel, an inner surface having a second channel, and a first annular end seal fixedly secured to the first end of the first annular piston, and wherein the first channel is disposed axially offset from the second channel;
    a second annular piston at least partially slidably disposed in the second annular slot, the second annular piston including an axially facing first end, a second end opposite the first end, an outer surface having a third channel and an inner surface having a fourth channel, and a second annular end seal fixedly secured to the first end of the second annular piston, and wherein the third channel is disposed axially offset from the fourth channel;
    a first annular piston chamber defined by the first annular slot and the first annular piston, wherein the first annular piston chamber is filled with a hydraulic fluid;
    a second annular piston chamber defined by the second annular slot and the second annular piston, wherein the second annular piston chamber is filled with the hydraulic fluid;
    a first outer seal disposed in the first channel of the first annular piston;
    a second outer seal disposed in the third channel of second annular piston;
    a first inner seal disposed in the second channel of the first annular piston;
    a second inner seal disposed in the fourth channel of second annular piston;
    a first annular bearing assembly having a first race in contact with the second end of the first annular piston and a second race in communication with one of the clutches of the dual clutch; and
    a second annular bearing assembly having a first race in contact with the second end of the second annular piston and a second race in communication with the other of the clutches of the dual clutch, and
    wherein the dual clutch is actuated by independently pressurizing the hydraulic fluid in at least one of the first and second annular piston chambers forcing at least one of the first and second annular pistons to slide out of the first and second annular slots and wherein the first inner seal and first outer seal prevent debris from entering the first piston chamber and the second inner seal and second outer seal prevent debris from entering the second piston chamber.

2. The dual clutch actuation device of claim 1, wherein the first and second outer seal further comprises a body portion substantially disposed in the channels of the first and second annular pistons and a wiper portion substantially protruding from the channels of the first and second annular pistons.

3. The dual clutch actuation device of claim 2, wherein the first and second inner seal further comprises a body portion substantially disposed in the channels of the first and second annular pistons and a wiper portion substantially protruding from the channels of the first and second annular pistons.

4. The dual clutch actuation device of claim 1, wherein the housing has a central bore concentric with the first and second annular slots and inward of the first annular slot.

5. The dual clutch actuation device of claim 1, further comprising a position sensor attached to the housing of the actuation device for sensing the position of the first and the second annular pistons.

6. The dual clutch actuation device of claim 5, wherein the position sensor includes two sensing elements, one for sensing the position of the first annular piston and the other for sensing the position of the second annular piston.

7. The dual clutch actuation device of claim 6, wherein one of the two sensing elements for sensing the position of the first annular piston is disposed radially outward of the first annular chamber.

8. The dual clutch actuation device of claim 7, wherein the other of the two sensing elements for sensing the position of the second annular piston is disposed between of the first and the second annular chambers.

9. The dual clutch actuation device of claim 1, wherein the second annular slot is concentric with and radially inward of the first annular slot.

10. A dual clutch actuation device for actuating a dual clutch in a dual clutch transmission, wherein each clutch of the dual clutch includes frictional members and actuation levers and wherein the actuation levers apply an axial compression force on the frictional members to actuate each clutch of the dual clutch, the dual clutch actuation device comprising:
    a housing fixedly secured to the dual clutch transmission and defining first and second annular slots, wherein the second annular slot is concentric with and radially inward of the first annular slot;
    a first annular piston at least partially slidably disposed in the first annular slot, wherein the first annular piston has an axially facing first and second end, an outer surface having a first channel and an inner surface having a second channel, and wherein the first channel is disposed axially offset from the second channel;

a second annular piston at least partially slidably disposed in the first annular slot, wherein the second annular piston has an axially facing first and second end, an outer surface having a third channel and an inner surface having a fourth channel, and wherein the third channel is disposed axially offset from the fourth channel;

a first outer seal having a body portion substantially disposed in the first channel of the first annular piston and having a wiper portion disposed substantially outside of the first channel;

a second outer seal having a body portion substantially disposed in the third channel of second annular piston and having a wiper portion disposed substantially outside of the third channel;

a first inner seal having a body portion substantially disposed in the second channel of the first annular piston and having a wiper portion disposed substantially outside of the second channel;

a second inner seal having a body portion substantially disposed in the fourth channel of second annular piston and having a wiper portion disposed substantially outside of the fourth channel;

a first annular piston chamber defined by the first annular slot and the first annular piston, wherein the first annular piston chamber is filled with a hydraulic fluid;

a first annular seal fixedly secured to the first end of the first annular piston for sealing the first annular piston chamber;

a second annular piston chamber defined by the second annular slot and the second annular piston, wherein the second annular piston chamber is filled with the hydraulic fluid;

a second annular seal fixedly secured to the first end of the second annular piston for sealing the second annular piston chamber;

a first annular bearing assembly having a first race in contact with the first annular piston and a second race in communication with one of the actuation levers of one of the clutches of the dual clutch; and a second annular bearing assembly having a first race in contact with the second annular piston and a second race in communication with the other of the actuation levers of the other of the clutches of the dual clutch, and wherein the dual clutch is actuated by independently pressurizing the hydraulic fluid in the first and second annular piston chambers forcing the first and second annular pistons to slide out of the first and second annular slots and apply a force on at least one of the actuation levers and wherein the wiper portion of first inner seal and first outer seal prevent debris from entering the first piston chamber and the wiper portion of the second inner seal and second outer seal prevent debris from entering the second piston chamber.

11. The dual clutch actuation device of claim 10, wherein the housing has a central bore concentric with the first and second annular slots and inward of the first annular slot.

12. The dual clutch actuation device of claim 11, further comprising a position sensor attached to the housing of the actuation device for sensing the position of the first and the second annular pistons.

13. The dual clutch actuation device of claim 12, wherein the position sensor includes two sensing elements, one for sensing the position of the first annular piston and the other for sensing the position of the second annular piston.

14. The dual clutch actuation device of claim 13, wherein one of the two sensing elements for sensing the position of the first annular piston is disposed radially outward of the first annular chamber.

15. The dual clutch actuation device of claim 13, wherein the other of the two sensing elements for sensing the position of the second annular piston is disposed between of the first and the second annular chambers.

* * * * *